(12) United States Patent
    Insley

(10) Patent No.: US 11,127,021 B1
(45) Date of Patent: Sep. 21, 2021

(54) SYSTEM AND METHODS FOR INFORMATION HANDLING

(71) Applicant: ON.XYZ Incorporated, Woodinville, WA (US)

(72) Inventor: Jordan Insley, Woodinville, WA (US)

(73) Assignee: ON.XYZ Incorporated, Woodinville, WA (US)

(*) Notice: Subject to any disclaimer, the term of this patent is extended or adjusted under 35 U.S.C. 154(b) by 0 days.

(21) Appl. No.: 16/931,762

(22) Filed: Jul. 17, 2020

(51) Int. Cl.
    *G06Q 30/02* (2012.01)
    *G06Q 20/34* (2012.01)
    *G06Q 20/32* (2012.01)

(52) U.S. Cl.
    CPC ............. *G06Q 30/02* (2013.01); *G06Q 20/32* (2013.01); *G06Q 20/341* (2013.01)

(58) Field of Classification Search
    CPC ....... G06Q 30/02; G06Q 20/341; G06Q 20/32
    See application file for complete search history.

(56) References Cited

U.S. PATENT DOCUMENTS

2015/0249872 A1* 9/2015 Lee .................. G06Q 30/06 725/32
2020/0213685 A1* 7/2020 Snyder ............... H04N 21/858

* cited by examiner

*Primary Examiner* — Diane D Mizrahi

(57) ABSTRACT

Described herein are systems and methods to help the seller of collectible items develop and upload information about the collectible to e-commerce platforms.

3 Claims, 3 Drawing Sheets

US 11,127,021 B1

SYSTEM AND METHODS FOR INFORMATION HANDLING

CROSS-REFERENCES TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

Collectibles such as baseball cards, coins, comic books, video games, amongst others, are often sold on e-commerce marketplaces such as eBay and Amazon. A seller, placing a collectible on e-commerce marketplaces, is required to provide a minimum amount of information to a buyer. This information may include, but is not limited to, a description of the collectible, condition, and year. However, the more information a seller can provide, the more likely that the collectible will receive the value requested by seller. For a seller, finding the information or conforming the information to the requirements of various ecommerce platforms is burdensome.

BRIEF DESCRIPTION OF INVENTION

An object of the invention is to provide the seller of Collectible a platform that easily receives known data about a collectable.

Another object of the invention is to discover new information about a collectable.

Another object of the invention is to automatically conform data so that the data can automatically be loaded onto e-commerce marketplaces.

DESCRIPTION OF THE SEVERAL VIEWS OF THE DRAWINGS

Other features and advantages of the present invention will become apparent in the following detailed descriptions of the preferred embodiment with reference to the accompanying drawing.

DETAILED DESCRIPTION OF THE INVENTION

Figure 1:
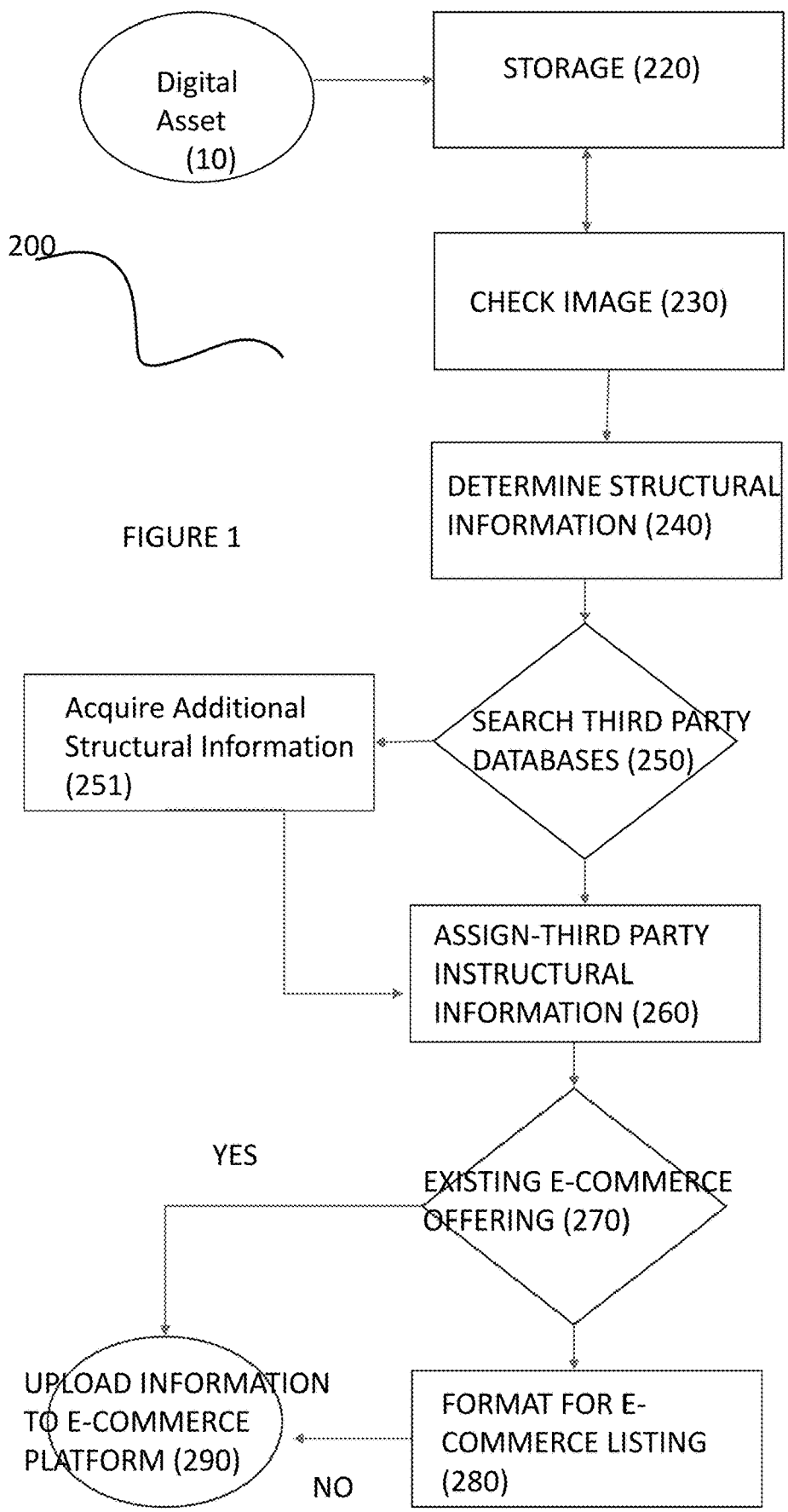
FIG. 1 is a flow cart showing an embodiment of the invention.

In the following detailed description, reference is made to the accompanying drawings, which form a part hereof. In the drawings, the use of similar or the same symbols in different drawings typically indicates similar or identical items, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting. Given by way of overview, illustrative embodiments include system and methods for information handling.

Referring to FIG. 1, in an embodiment a method for information handling (200) is comprised of receiving a photo and/or a scan of a product (220); searching third-party databases for structural information related to the photo and/or scan of the product (251); assigning third-party structural information to the photo and/or scan of the product (260); format a listing for an e-commerce marketplace that includes the photo and/or scan of the product, metadata related to the photo and/or scan, and third-party information and provide the same to the e-commerce marketplace (280). In some embodiments, the photo and/or scan of a product ("digital asset") (10) may be stored onto a data table. According to an embodiment, the digital asset (10) maybe stored onto a data table that is located on application programming interface ("API") enabled storage (220). In some embodiments, the storage is remotely located.

According to an embodiment, the method for information handling (200) is further comprised of a method to determine whether the digital asset (10) is new to the collection of the existing digital assets in the data table. (230) If the digital asset (10) is new, it is analyzed by any known imaging system that utilizes artificial intelligence to determine whether the digital asset (10) shows structural information. (240) In embodiments, Google Vision or OCR may be used to determine whether the digital asset (10) shows structural information.

Figure 2:
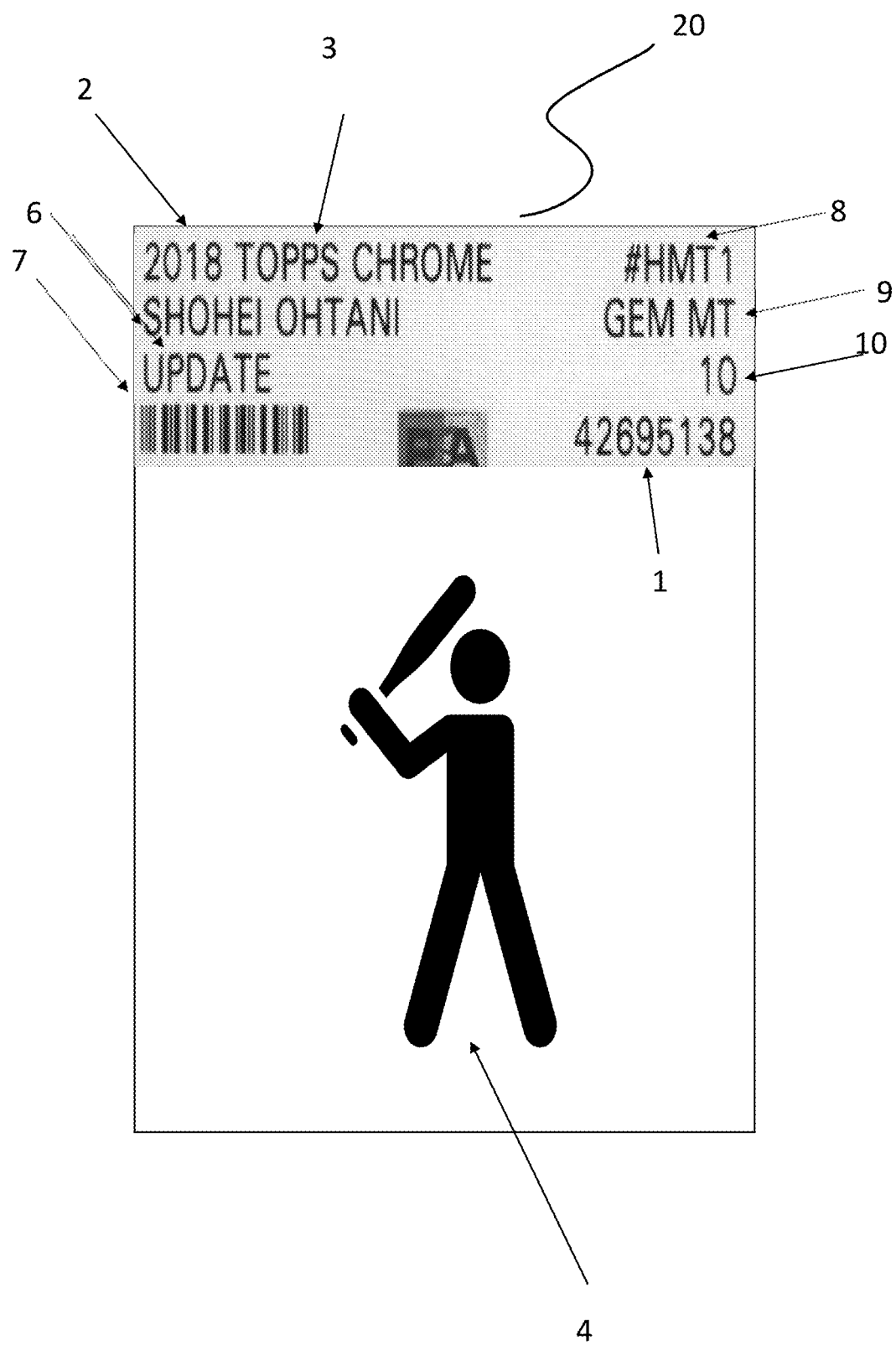
FIG. 2 is an exemplary embodiment of the digital asset.

Referring to FIG. 2, in an exemplary embodiment, the digital asset (10) may represent a baseball card (20). Collectible baseball cards (20) generally have a Professional Sports Authentication Certificate ("PSA Certificate). Structural information may be related to the baseball card such as PSA certification number (1), year (2), brand (3), sport identification (4), card number (5), player (6), variety/pedigree (7), grade (8), label type (9).

Figure 3:
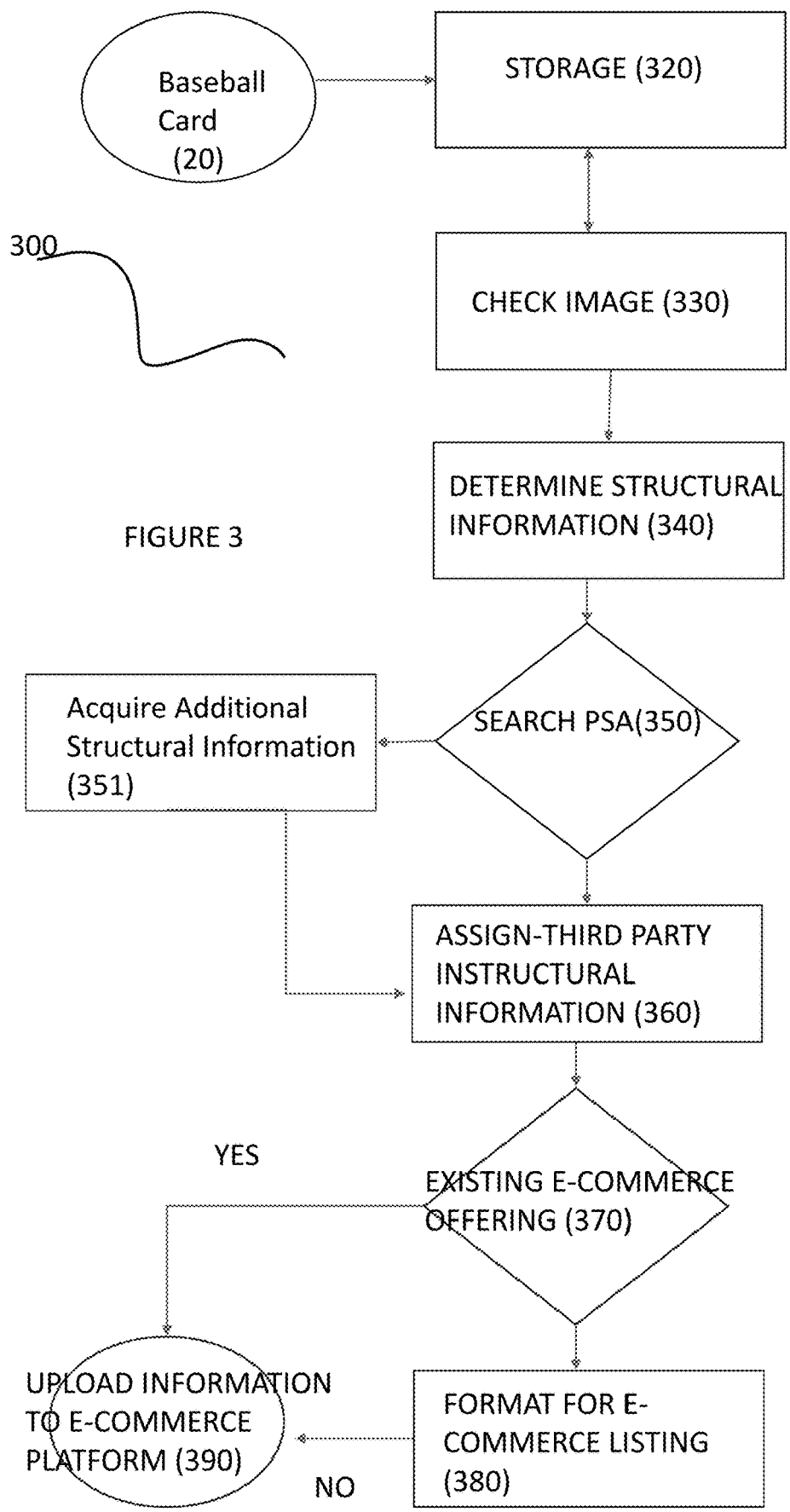
FIG. 3 is a flow chart showing an exemplary method of the invention.

Referring to FIG. 3, this exemplary method for information handling (300) is comprised of receiving a photo and/or a scan of a baseball card (320); searching third-party databases for structural information related to the photo and/or scan of the product (351); assigning third-party structural information to the photo and/or scan of the product (360); format a listing for an e-commerce marketplace that includes the photo and/or scan of the product, metadata related to the photo and/or scan, and third-party information and provide the same to the e-commerce marketplace (380). In some embodiments, the photo and/or scan of a product ("digital asset") (10) may be stored onto a data table. According to an embodiment, the digital asset (10) maybe stored onto a data table that is located on application programming interface ("API") enabled storage (320). In some embodiments, the storage is remotely located.

According to an embodiment, the method for information handling (300) is further comprised of a method to determine whether the digital asset (10) is new to the collection of the existing digital assets in the data table. (330) If the digital asset (10) is new, it is analyzed by any known imaging system that utilizes artificial intelligence to determine whether the digital asset (10) shows structural information. (340) In embodiments, Google Vision or OCR may be used to determine whether the digital asset (10) shows structural information.

Referring to FIG. 1, in embodiments, the present invention may provide for a computer program product embodied in a computer readable medium that, when executing on one or more computers, provides for a system and methods for in an embodiment a method for information handling (200) is comprised of receiving a photo and/or a scan of a product (220); searching third-party databases for structural information related to the photo and/or scan of the product (251); assigning third-party structural information to the photo and/or scan of the product (260); format a listing for an e-commerce marketplace that includes the photo and/or scan of the product, metadata related to the photo and/or scan, and third-party information and provide the same to the e-commerce marketplace (230). In some embodiments, the photo and/or scan of a product ("digital asset") (10) may be stored onto a data table. According to an embodiment, the digital asset (10) maybe stored onto a data table that is located on application programming interface ("API") enabled storage (220). In some embodiments, the storage is remotely located.

According to an embodiment, the method for information handling (200) is further comprised of a method to determine whether the digital asset (10) is new to the collection of the existing digital assets in the data table. (230) If the digital asset (10) is new, it is analyzed by any known imaging system that utilizes artificial intelligence to determine whether the digital asset (10) shows structural information. (240) In embodiments, Google Vision or OCR may be used to determine whether the digital asset (10) shows structural information. The methods and systems described herein may be deployed in part or in whole through a machine that executes computer software, program codes, and/or instructions on a processor. The present invention may be implemented as a method on a machine, as a system or apparatus as of or in relation to the machine, or as a computer program product embodied in computer readable medium executing on one or more of the machines. The processor may be part of a servicer, client, network infrastructure, mobile computing platform, stationary computing platform, or other computing platform. A processor may be any kind of computational or processing device capable of executing program instructions, codes, binary instructions and the like. The processor may be or includes a single processor, digital processor, embedded processor, microprocessor, or any variant such as a co-processor (math co-processor, graphic co-processor, communication co-processor and the like) and may directly or indirectly facilitate execution of multiple program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have been assigned priorities associated with them; the processor may execute these threads based on priority or any other order based on instructions provided in the program code. The processor may include memory that stores methods, codes, instructions and programs as described herein and elsewhere. The processor may access a storage medium associated with the processor to storing methods, programs, codes, program instructions or other types of instruction capable of being executed by the computing process device may include but may not be limited to one or more of CD-ROM, DVD, memory, hard disk, flash drive, RAM, ROM, cache, and the like.

A processor may include one or more cores that may enhance speed and performance of a multiprocessor. In embodiments, the processor may be a dual core processor, quad core processor, or other chip level multiprocessor and the like that combine two or more independent cores (called a die).

The methods and systems described herein may be deployed in part or in whole through a machine that executes computer software on a server, client, firewall, gateway, hub, router, or other such computer or networking hardware. The software program may be associated with a server that may include a file server, print server, domain server, internet server, intranet server, and another variant such as secondary server, host server, distributed server, and the like. The server may include one or more of memories, processors, computer communication devices, and interfaces capable of accessing other client servers, clients, machines, and devices through wired or wireless medium, and the like. The methods, programs or codes described herewith and elsewhere may be executed by the server. In addition, other devices required for execution of methods as described in this application as part of an infrastructure associated with the server.

The server may provide an interface to other devices including, without limitation, clients, other servers, printers, database servers, print servers, file servers, communication servers, distributed servers and the like. Additionally, this coupling and connection may facilitate remote execution of program across the network. The networking of some or all of these devices may facilitate parallel processing of a program or method at one or more locations without deviating from the scope of the invention. In addition, any of the devices attached to the server through an interface may include at least one storage medium capable of storing methods, programs, code and/or instructions to be executed on different devices. In this implementation, the remote repository may act as a storage medium for program code, instructions, and programs.

The software program may be associated with a client that may include a file client, print client, domain client, internet client, and other variants such as secondary clients, host clients, distributed clients and the like. The client may include one or more memories, processors, computer readable media, storage media, ports (physical and virtual). Communication devices, and interfaces capable of accessing other clients, servers, machines, and devices, and interfaces capable of accessing other clients, servers, machines, and devices, through a wired or wireless medium, and the like. The methods, programs or codes as described herein and elsewhere may be executed by the client. In addition, other devices required for execution of the methods as described herein this application may be considered as a part of the infrastructure associated with the client.

The client may provide an interface to other devices including without limitation, servers, other clients, printers, data-based servers, file servers, communications servers, distributed servers and the like. Additionally, coupling and/or connection may facilitate remote execution of program across the network. The networking of some or all of the devices may facilitate parallel processing of a program or method at one or more locations without deviating from the scope of this invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The method and systems described herein may be deployed in part or in whole through network infrastructures. The network infrastructure may include elements such as computing devices, servers, routers, hubs, firewalls, clients, personal computers, communication devices, routing devices, and other active and passive devices, modules and/or components known in the art. The computing and or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be GSM, GPRS, #G 4G, EVDO, mesh, or other network types.

The methods, programs, codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as a flash memory, buffer, RAM, ROM, and one or more computing devices. The computing devices associated with mobile devices maybe enabled to execute program codes, methods, and instructions stored thereon. Alternatively, the mobile device maybe configured to execute instructions in collaboration with other devices. The mobile devices may communicate on a peer to peer network. The program code maybe stored on the storage medium associated with the server and executed by a computing device embedded within the server. The base station may include a computing devices and a storage medium. The storage device may store program code and instructions executed by computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage such as optical discs, forms of magnetic storage, like hard disks, tapes, drums, cards, and other types; processor registers, cache memory, volatile memory, non-volatile memory, optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, network attached storage, file addressable, content addressable, network, barcodes, magnetic ink, and the like.

The methods and systems described herein may transform physical and/or intangible items from one state to another. The methods and systems or intangible items from one state to another. The methods and systems described herein may also transform data representing physical and/or intangible items from one state to another.

The elements described and depicted herein, including flow charts and block diagrams throughout the figures, imply logical boundaries between the elements. However, according to software or hardware engineering practices, the depicted elements and functions thereof may be implemented on machines through computer executable media having a processor capable of executing program instructions, as standalone software modules, or as modules that employ external routines, codes, services, and so forth, or any combination of these, and all such implementations maybe within the scope of the present disclosures. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps hereof, may be realized in hardware, software or any combination of hardware and software suitable for an application. The hardware may include a general-purpose computer and/or dedicated computing device or specific computing device or aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof, and may be distributed across devices in several ways, or all the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

I claim:

1. A method for information management implemented on general-purpose computer with processor-executable program instructions configured to direct at least one processor and at least one stored data table, including data useful for predictive analysis, for automatically formatting an e-commerce profile is comprised of:
    (a) receiving a digital asset that is a baseball card;
    (b) storing the digital asset onto at least one data table;
    (c) searching third-party data bases for structural information related to the digital asset;
    where the structural information is comprised of a Professional Sports Authenticator certification number, year brand, sport identification, card number, player, variety/pedigree, grade, label type;
    (d) assigning found third-party structural information to the digital asset;
    (e) formatting a profile for the digital asset on an e-commerce marketplace that includes the digital asset, metadata related to the digital asset, and third-party structural information;
    (f) providing the formatted profile to an e-commerce marketplace to be listed on the e-commerce marketplace.

2. The method for information management of claim 1 whereby, the data table that is located on application programming interface enabled storage.

3. The method for information management of claim 1 is further comprised of a method to determine whether the digital asset is new to the collection of the existing digital assets in the data table.

* * * * *